Patented July 27, 1926.

1,594,133

UNITED STATES PATENT OFFICE.

WILHELM TAFEL, OF BRESLAU, GERMANY.

PROCESS OF TREATING INGOT IRON.

No Drawing. Application filed August 22, 1924, Serial No. 733,576. and in Germany June 16, 1923.

My invention relates to a process for the treatment of ingot iron with a finished welding slag of a composition dissolving ferric oxide ($Fe_2O_3$) and ferrous oxide (FeO) or cinders or with slag of a similar composition. More especially, the invention relates to a process for manufacturing from a liquid material iron or steel which is strongly deoxidized similarly to wrought-iron or weld-iron.

Concerning the working of iron or steel in cold state ingot-iron are generally superior to wrought-iron or weld-iron but this latter offers valuable advantages when being worked in hot state. Wrought-iron or weld-iron can be welded easier and more securely, and there are shapes which can be pressed, welded, or rolled, in one phase if wrought-iron or weld-iron is used, whereas several phases are required if ingot iron is employed. Wrought-iron or weld-iron require only a slight expenditure of power for being rolled or pressed, and when it is turned or screw-threads are being cut on it the chips separated more easily, and only little heat is generated. In the same manner the steel manufactured according to the acidic process (Bessemer) has several properties which could have been attained either not at all or not in the same measure as with steel produced according to the basic process (Thomas).

These properties of the acidic steel are attributed mostly to the action of the silicic acid which forms an essential component of the furnace-slag in the acidic process, as well as of the welding-slag. Some experts seek the cause for this striking behaviour also in the contents of weld-iron slag in the iron oxides, or in the mechanical admixture of very small slag-particles to the iron, as is the case with wrought-iron or weld-iron. It was, therefore, obvious to treat steel first on the acidic way and then on the basic one in order to combine the advantages of both processes.

A process of this kind is the so-called duplex-process of Witkowitz, in which pig-iron is first blown preliminarily in the acidic converter and then finished in a hearth-furnace prepared for the basic process. Others decarburize preliminarily on the basic hearth and finish on the acidic one, or they add a substance or substances rich in silicic acid to the slag resulting from the smelting process, as is done by Pszozolka, of Graz, Austria, to whom had been granted German patent 52,-848 relating to "the addition of a substance or substances containing much silicic acid to the metal produced according the basic process". Another expert, Thallner, has obtained U. S. Patent 1,053,454, relating to a process of adding ores or slag, which are carriers of the oxides of iron, to the bath. Finally, a process has been patented in Germany under No. 41,114 in which solid granulated iron is mixed with liquid or pasty slag in order to provide similar conditions as exist in the production of wrought-iron or weld-iron.

It appears from these processes that the respective inventors did not have any knowledge of the fact on which my present improved process is based, viz the fact that the peculiar action and effect of the welding-slag is based neither solely on its contents of iron oxide, not, solely on its contents of silicic acid, but on the combined contents of iron oxide, as well as silicic acid. Furthermore the other essential idea does not appear in said publications, viz that instead of forming a new slag in the furnace by the slagging of iron oxides and silicic acid, it is more simple to add to the iron a finished slag having the same composition as the slag forming when wrought-iron or weld-iron is produced, and being known as particularly efficacious in this latter process. The welding slag of the composition stated in the first paragraph after the preamble forms when iron containing iron oxide or having grown rusty or having in fire become covered with hammer-slag, is heated on a bottom containing silicic acid. There then arises beyond the surfaces of contact a peculiar interaction of the silicic acid and the iron oxide, the compound of which, viz the welding-slag of the composition stated, dissolved silicic acid as well as iron oxide, in that it tends to attain a state of equilibrium which is reached earlier or later according to the temperature and other conditions. Wrought-iron or weld-iron slag obtained in this manner and having the properties resulting from the method of its production stated is an extraordinary strong dissolvent of ferrous oxydous (FeO) and for other degrees of oxidation which are the causes for the iron becoming red-short, and for other properties detrimental to the working of the iron in hot state. Trials have proved that even strongly rusty or hammer-slag-covered iron is being freed at once from the oxides adhering to it when being dipped into the liquid welding-slag in question.

Based on the considerations disclosed in the preceding paragraphs, as well as on the experiments and trials made, my invention consists in treating the liquid steel with already prepared welding-slag of the composition stated, either such as is flowing off from a welding-furnace or from a re-heating furnace, or such as obtained in any other way, but under similar conditions and having similar properties. In contradistinction to the known processes mentioned in one of the preceding columns, I do not make use of a deoxidizing slag, the composition of which as regards its contents of silicic acid or of substances containing iron oxide, is a matter of casual circumstances active either during the smelting or afterwards, but I do make use of a distinct slag having intentionally just that composition which is known to be particularly efficacious in the production of wrought-iron or weld-iron, and being added to the iron or steel in finished state.

The reaction proceeds very energetically and the effect on the properties of the iron produced are strong. The most essential effects reside in the contents of carbon in the iron being diminished, and the iron becoming softer, the strength of the iron being reduced from 38–40 kg. down to 30 kg; of course, it will be possible to obtain by the present process a greater strength of any desired degree by means of an appropriate composition of the steel. Besides, the manganese is transposed from the iron into the slag which is enriched correspondingly and from which the manganese can be recovered. Like wrought-iron or weld-iron, the iron produced according to my improved process is excellently suited to be worked in hot state and is very stable in high temperatures. Finally, the welding-slag of the composition stated when being piled on the base in pulverulent form, protects the blocks from being welded spontaneously to the base, and ensures easy lifting by the crane also when the otherwise used means, (painting, lining with bricks) are omitted.

I claim:

The process of producing from liquid material iron or steel which is strongly deoxidized similarly to wrought-iron or weld-iron, consisting in adding to the molten ingot in the furnace a mixture or a slag, containing ferric oxide, ferrous oxide and silica, substantially as described.

In testimony whereof I affix my signature.

WILHELM TAFEL.